United States Patent [19]

Ashby, Jr.

[11] 4,332,396

[45] Jun. 1, 1982

[54] BACKING STABILIZER

[76] Inventor: George M. Ashby, Jr., 520 E. Hazel, Ponca City, Okla. 74601

[21] Appl. No.: 172,570

[22] Filed: Jul. 28, 1980

[51] Int. Cl.³ .............................................. B60D 1/00
[52] U.S. Cl. ......................... 280/474; 280/DIG. 14
[58] Field of Search ............... 280/474, DIG. 14, 445, 280/457, 458, 408, 432, 446 B, 448

[56] References Cited

U.S. PATENT DOCUMENTS

| | | | |
|---|---|---|---|
| 1,573,320 | 2/1926 | Kline | 280/474 |
| 2,159,721 | 5/1939 | Wright | 280/474 X |
| 2,718,410 | 9/1955 | Simmons | 280/DIG. 4 |

*Primary Examiner*—John A. Pekar

*Attorney, Agent, or Firm*—Dunlap & Codding

[57] ABSTRACT

A backing stabilizer for use in conjunction with a tractor having a tractor trailer pivotally connected thereto and another trailer with a tongue having one end pivotally connected to the tractor trailer and having the opposite end pivotally connected to the other trailer. The backing stabilizer includes a continuous cable having a portion connected to the tongue, means for movably connecting a portion of the cable to the trailer, and means for moving the cable to a slack condition wherein the tongue is pivotally movable and for moving the cable to a taut condition wherein the tongue is substantially held in a nonpivotable position by the cable.

13 Claims, 6 Drawing Figures

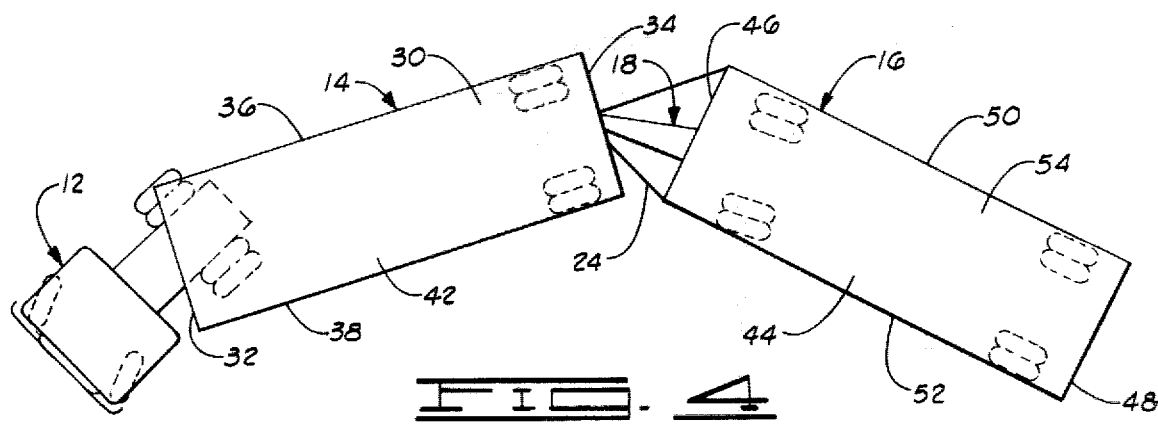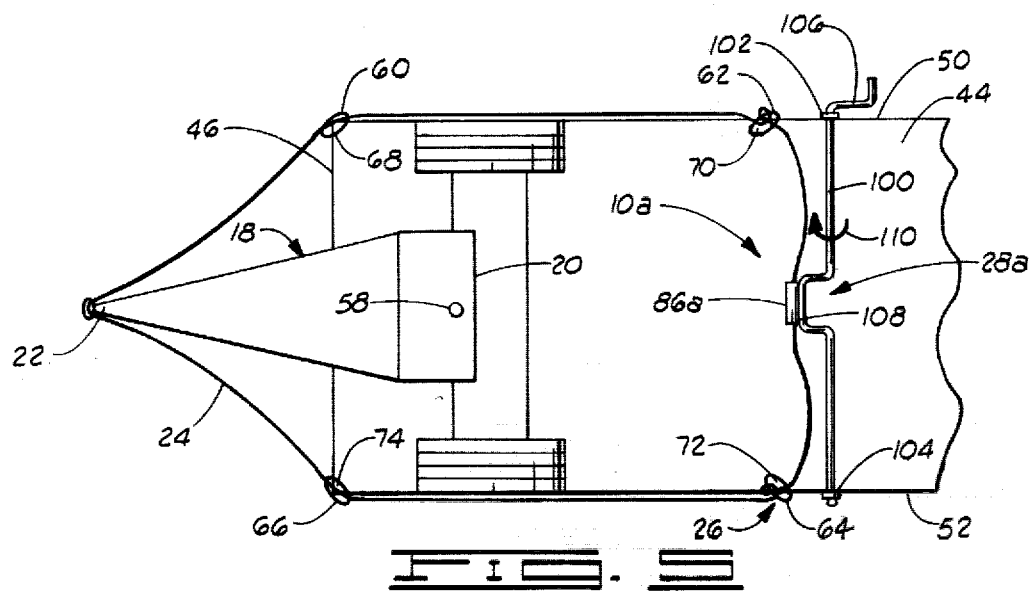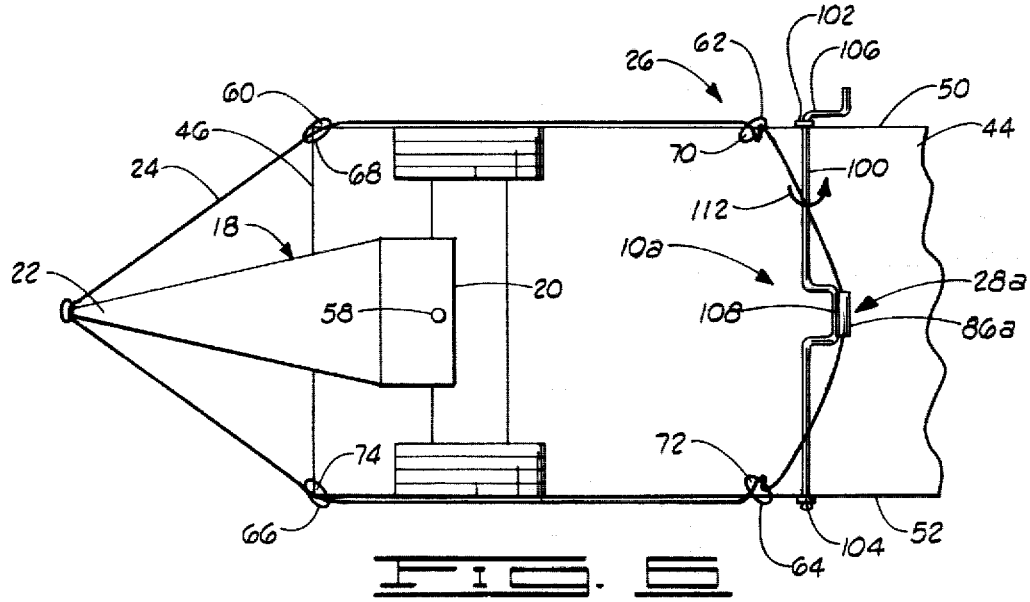

BACKING STABILIZER

BACKGROUND OF THE INVENTION

Field of the Invention

The present invention generally relates to a system for improving the maneuverability of tractors pulling two trailers and, more particularly, but not by way of limitation, to a system for securing the tongue, which pivotally connects the two trailers, in a nonpivotable position.

BRIEF DESCRIPTION OF THE DRAWINGS

FIG. 4 is a top plan view showing a tractor pulling two trailers with the trailers being positioned at an angle with respect to each other.

FIG. 5 is a view similar to FIG. 1, but showing a modified backing stabilizer with the cable in the slack condition.

FIG. 6 is a view similar to FIG. 5, but showing the cable in the taut condition.

BRIEF DESCRIPTION OF THE PREFERRED EMBODIMENTS

Figure 1:
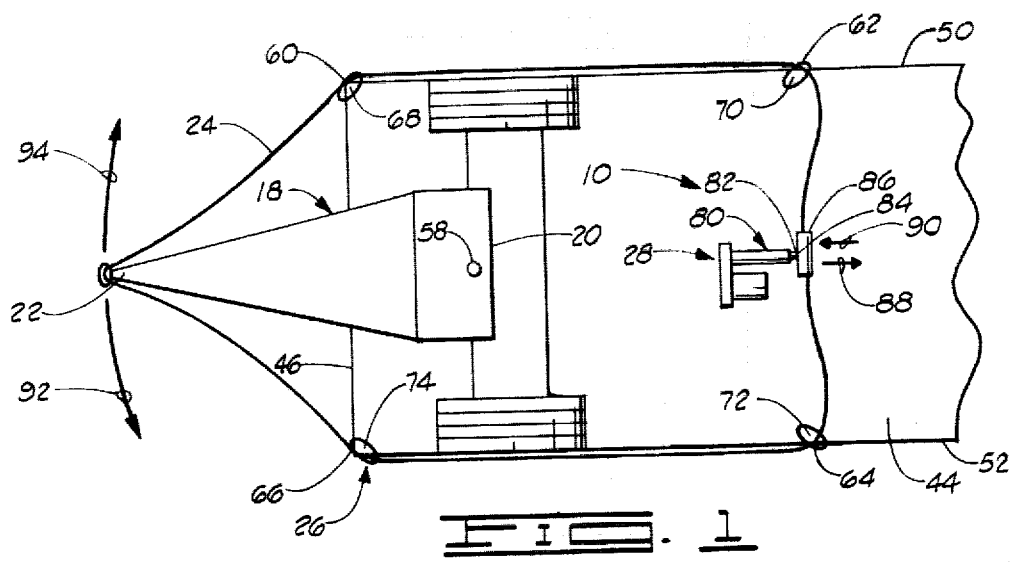
FIG. 1 is a view showing a portion of the bottom of a rear trailer and showing the backing stabilizer connected to the trailer, the cable portion of the backing stabilizer being shown in a slack condition.
Figure 2:
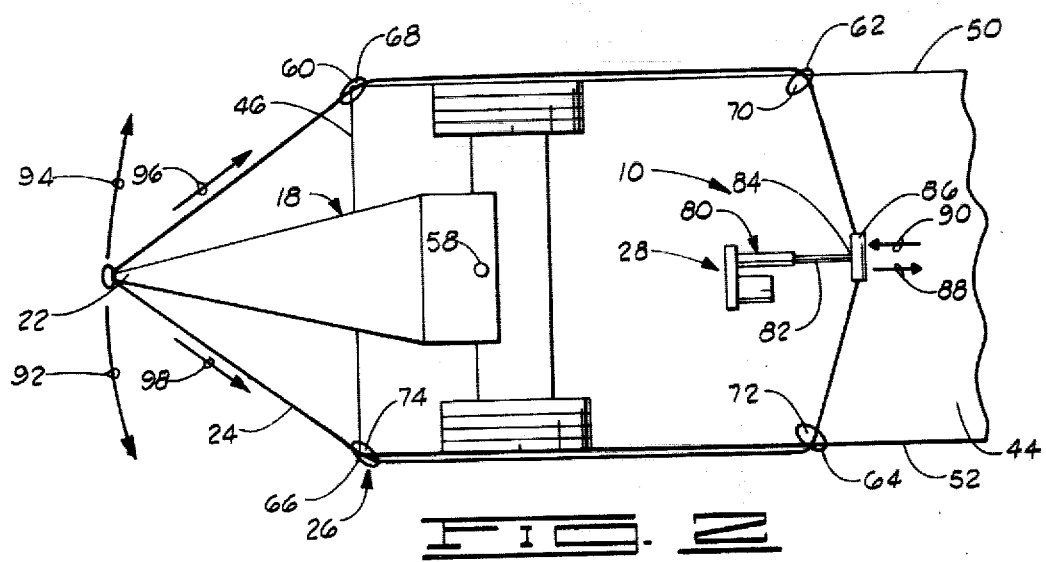
FIG. 2 is a view similar to FIG. 1, but showing the cable portion of the backing stabilizer in a taut condition.

Referring to the drawings in general and to FIGS. 1 and 2 in particular, shown therein and designated by the general reference numeral 10 is a backing stabilizer which is constructed in accordance with the present invention. The backing stabilizer 10 particularly is adapted to be utilized in conjunction with a tractor 12 which is pulling two trailers 14 and 16 (shown in FIGS. 3 and 4). In this type of application, one end of the trailer 14 is pivotally connected to one end of the tractor 12. A tongue 18, having a first end 20 and a second end 22, pivotally connects the trailers 14 and 16, the first end 20 of the tongue 18 being pivotally connected to the trailer 16 and the second end 22 of the tongue 18 being pivotally connected to the trailer 14. The backing stabilizer 10 includes: a continuous cable 24 which is connected to the tongue 18 generally near the second end of the tongue 18; a support assembly 26 which movably connects a portion of the cable 24 to the trailer 16 for supporting a portion of the cable 24 from the trailer 16; and an actuator assembly 28 which is connected to the cable 24 and adapted to move the cable 24 to a slack condition (shown in FIG. 1) wherein the tongue 18 is pivotally movable about the pivot connection between the tongue 18 and the trailer 16 and to move the cable 24 to a taut condition (shown in FIG. 2) wherein the tongue 18 substantially is held in a nonpivotable condition by the cable 24, the tongue 18 not being pivotable about the pivot connection between the tongue 18 and the trailer 16 in the nonpivotable condition of the tongue 18.

The backing stabilizer 10 particularly is useful in facilitating the backing of the rear or second trailer 16 to a loading dock. In the past to position a tractor pulling two trailers (known in the art as a set of doubles) in condition for loading, it has been necessary to lower the stands on the rear or second trailer, disconnect the dolly and pull the dolly (front set of wheels) out from under the rear or second trailer, pull the dolly some distance away from the rear or second trailer, disconnect this dolly from the front or first trailer, park the front or first trailer for loading at the dock, disconnect the tractor from the front or first trailer, back the tractor to and make connection between the tractor and the second trailer, park the second trailer for loading at the dock, and manually roll the dolly from the second trailer to a position in front of the first trailer, which now will become the second trailer. This procedure requires a great deal of time (fifteen minutes or more) and a great deal of manual effort.

Utilizing the backing stabilizer 10 of the present invention, the driver lines the tractor 12 and the two trailers in a relatively straight line perpendicular to the dock, as shown in FIG. 1, actuates the actuator assembly 28 to move the cable 24 to the taut condition, back the second or rear trailer 16 to a loading position against the dock, disconnect the tongue 18 from the first or front trailer 14, and then back the front trailer 14 to a loading position against the dock. Thus, utilizing the backing stabilizer 10, the two trailers 14 and 16 can be positioned in a loading position against the dock in much less time and in a manner requiring much less physical effort. Further, utilizing the backing stabilizer 10, the trailers 14 and 16 can be placed in a loading position in a safer manner which reduces the possibilities of personal injury present when manually handling the dolly as in the past.

Figure 3:
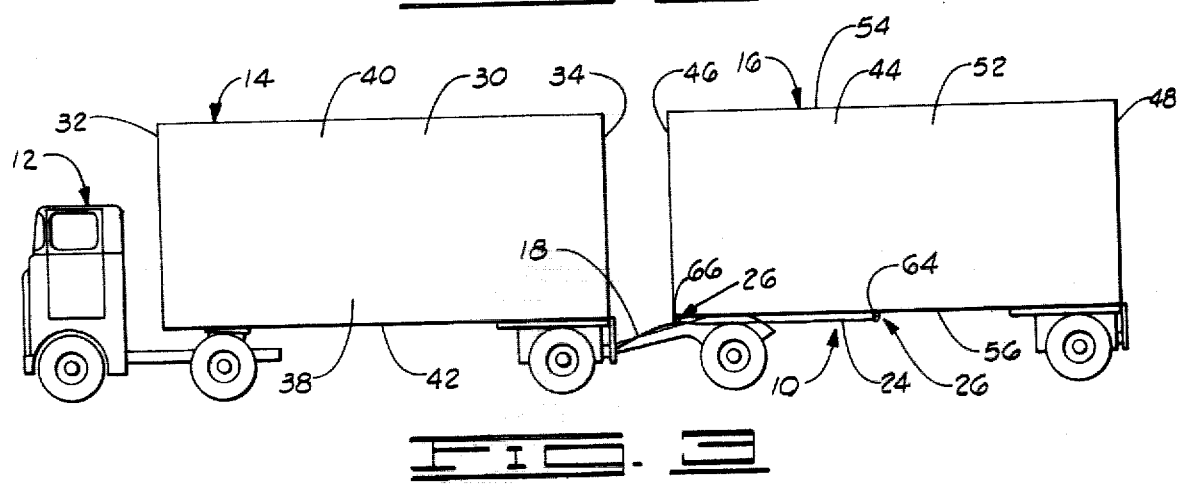
FIG. 3 is a side elevational view showing a tractor pulling two trailers and incorporating the backing stabilizer of the present invention.

As shown more clearly in FIGS. 3 and 4, the front trailer 14 includes a vehicle body 30 having a first end 32, a second end 34, a first side 36, a second side 38, a top 40 and a bottom 42. The rear trailer 16 includes a vehicle body 44 having a first end 46, a second end 48, a first side 50, a second side 52, a top 54 and a bottom 56. The trailers 14 and 16 sometimes are referred to herein simply as "vehicles" because the backing stabilizer 10 is not limited to use with any particular type of trailer or vehicle.

As shown in FIGS. 1 and 2, the tongue 18 is connected to the vehicle body 44 generally at a pivot connection 58, the pivot connection 58 being located on the bottom 56 of the vehicle body 44 generally between the first side 50 and the second side 52 and generally near the first end 46 of the vehicle body 44. The tongue 18 extends a distance from the first end 46 of the vehicle body 44 terminating with the second end 22 of tongue 18. The second end 22 of the tongue 18 is adapted to be pivotally connected to the vehicle body 30 of the front trailer 14, generally near the second end 34 of the trailer 14, in a manner and for reasons well known in the art.

The support assembly 26 includes a first ring 60, a second ring 62, a third ring 64 and a fourth ring 66. The first ring 60 has an opening 68 extending therethrough and the first ring 60 is secured to the vehicle body 44, generally near the first side 50 and generally near the first end 46 and generally near the bottom 56 of the vehicle body 44. The second ring 62 has an opening 70 extending therethrough and the second ring 62 is secured to the vehicle body 44 generally near the first side 50 and generally between the first end 46 and the second end 48 and generally near the bottom 56 of the vehicle body 44. The third ring 64 has an opening 72 extending therethrough and the third ring 64 is secured to the vehicle body 44 generally near the second side 52 and generally between the first end 46 and the second end 48 and generally near the bottom 56 of the vehicle body 44. The fourth ring 66 has an opening 74 extending therethrough and the fourth ring 66 is secured to the vehicle body 44 generally near the second side 52 and generally near the first end 46 and generally near the bottom 56 of the vehicle body 44. Although rings 60, 62, 64 and 66 have been shown in the drawings, it should be noted that other structures which would support the cable 24 and yet permit some movement of the cable 24 would be utilized.

The cable 24 is securedly connected to the tongue 18, generally near the second end 22 of the tongue 18. The cable 24 extends from the tongue 18 to the first ring 60, the cable 24 extending through the opening 68 in the first ring 60. The cable 24 extends from the first ring 60 to the second ring 62, the cable 24 extending through the opening 70 in the second ring 62. The cable 24 extends from the second ring 62 to the third ring 64, the cable 24 extending through the opening 72 in the third ring 64. The cable 24 extends from the third ring 64 to the fourth ring 66, the cable 24 extending through the opening 74 in the fourth ring 66. The cable 24 extends from the fourth ring 66 to the second end 22 of the tongue 18. It should be noted that the cable 24 actually extends beyond the ring 62 and is looped back through the opening 70 and the cable 24 actually extends beyond the ring 64 and is looped back through the opening 72.

The actuator assembly 28 comprises an actuator 80 which is supported on the bottom 56 of the vehicle body 44 generally between the first side 50 and the second side 52 and generally near the portion of the cable 24 extending between the second ring 62 and the third ring 64. The actuator 80 includes a member 82 which is movably supported within the actuator 80, a portion of the member 82 extending from the actuator 80 terminating with an end 84. A tube 86 is secured to the end 84 of the member 82 and the cable 24 extends through an opening (not shown in the drawings) which extends axially through the tube 86, the tube 86 operating to movably connect the cable 24 to the end 84 of the member 82.

The actuator 80 is adapted to move the member 82 in a direction 88 generally away from the actuator 80 and to move the member 82 in a direction 90 generally into or toward the actuator 80. The actuator 80 is supported on the vehicle body 44 and oriented such that, when the actuator 80 causes the member 82 to be moved in the direction 88, the member 82 and the cable 24 movably connected thereto are moved in a direction generally away from the tongue 18, the actuator 80 being positioned and adapted to move the member 82 and the cable 24 movably connected thereto in the direction 88 to a position wherein the cable 24 is in the taut condition. The actuator 80 is supported on the vehicle body 44 and oriented such that, when the actuator 80 causes the member 82 to be moved in the direction 90, the member 82 and the cable 24 movably connected thereto are moved in a direction generally toward the tongue 18, the actuator 80 being positioned and adapted to move the member 82 and the cable 24 in the direction 90 to a position wherein the cable 24 is in the slack condition.

Actuators constructed to operate in a manner like that just described with respect to the actuator 80 are commercially available. One commercially available actuator which is suitable for the actuator 80 is referred to as a linear actuator and is available from Saginaw Steering Gear Division of General Motors Corporation, Saginaw, Mich. This particular type of actuator includes an elongated screw, a tubular housing disposed over and connected to the elongated screw (member 82) and an electric motor. The motor shaft is connected to the elongated screw through drive gearing. When power is connected to the motor in one way, the motor rotatingly drives the elongated screw to move the tubular housing in a direction away from the actuator and, when power is connected to the motor in another way, the motor rotatingly drives the elongated screw to move the tubular housing in a direction toward the actuator.

The cable 24 has a predetermined length and, when the cable 24 is connected to the tongue 18 and supported from the rings 60, 62, 64 and 66 and when the member 82 has been moved in the direction 90 to condition the cable 24 in the slack condition (FIG. 1), the tongue 18 is pivotally moveable in a direction 92 and in a direction 94 about the pivot connection 58, the cable 24 being long enough so that the cable 24 does not inhibit the movement of the tongue 18 in the slack condition of the cable 24. When the member 82 is moved in the direction 88, the cable 24 is pulled taut (moved to a taut condition) and, in the taut condition (FIG. 2) of the cable 24, the cable 24 pulls at the tongue 18 in a direction 96 (FIG. 2) generally toward the first side 50 of the vehicle body 44 and the cable 24 pulls at the tongue 18 in a direction 98 (FIG. 2) with an equal force generally toward the second side 52 of the vehicle body 44. Thus, by the way the cable 24 is supported and connected to the tongue 18, the cable 24 operates to prevent the tongue 18 from pivotally moving about the pivot connection 58 in the taut condition of the cable 24.

The actuator 80 is controlled from the tractor 14 so the operator can position the actuator 80 to place the cable 24 in the taut condition or the slack condition from the tractor 14. As mentioned before, the actuator can be of the type which utilizes an electric motor and, in this event, the controls in the tractor merely would consist of a control device for controlling the electric motor. With hydraulic type actuators, the controls of course would be of the hydraulic type. In view of the description herein, various controls will become evident to those skilled in the art and a detailed description of the specific devices for controlling the actuator 80 from the tractor 12 is not deemed necessary.

Embodiment of FIGS. 5 and 6

Shown in FIGS. 5 and 6 is a modified backing stabilizer 10a. The modified backing stabilizer 10a is constructed and operates exactly like the backing stabilizer 10 described in detail before, except the backing stabilizer 10a includes a modified actuator assembly 28a.

The actuator assembly 28a includes a rod 100 which is journally connected to vehicle body 44 by two bearing supports 102 and 104, the rod 100 extending generally between the first side 50 and the second side 52 of the vehicle body 44. A crank arm 106 is formed on one end portion of the rod 100. A protruding portion 108 is formed on a midportion of the rod 100, the protruding portion 108 extending a distance from the axis of the rod 100. A tube 86a is connected to the protruding portion 108 and the cable 24 extends through an opening (not shown) in the tube 86a, the tube 86a movably connecting the cable 24 to the rod 100.

When the crank arm 106 is rotated in a direction to cause the rod 100 to be rotated in a direction 110, the protruding portion 108 is moved to the position shown in FIG. 5 wherein the protruding portion 108 extends generally toward the tongue 18, thereby moving the cable 24 portion connected to the protruding portion by the tube 86a generally toward the tongue 18 to the slack condition (shown in FIG. 5). The cable 24 has the predetermined length and is supported from the vehicle body 44 such that, in the slack condition of the cable 24, the tongue 18 is pivotable about the pivot connection 58 in the directions 92 and 94. When the crank arm 106 is rotated in a direction to cause the rod 100 to be rotated in a direction 112, the protruding portion 108 is rotated in a direction generally away from the tongue 18 to the position shown in FIG. 6, thereby moving the portion of the cable 24 which is movably connected to the tongue 18 by the tube 86a in a direction generally away from the tongue 18 and moving the cable 24 to the taut condition (shown in FIG. 5). In the taut condition of the cable 24, the tongue 18 is not movable about the pivot connection 58 in a manner and for reasons described before.

It should be noted that, although the crank arm 106 has been shown as being manually operable, a gear could be connected to one end of the rod 100 and a motor could be drivingly connected to the gear for rotating the rod 100. Various other devices are known in the art for rotating rods which could be controlled from the tractor 12 automatically.

It should be noted that, although the cable 24 has been defined herein as being a continuous cable, various constructions will be apparent to those skilled in the art in view of the foregoing disclosure wherein the cable per se is not one continuous length of cable. For example, one end of a cable could be connected to the tongue 18, the cable then could be extended through the support assembly 26 and the opposite end of the cable then could be connected to the tongue 18. In any event, the term "continuous cable" as used herein means a cable which is constructed and supported to provide the result described herein with respect to the cable 24 portion of the backing stabilizers 10 and 10a.

Changes may be made in the various elements, parts and assemblies without departing from the spirit and the scope of the invention as defined in the following claims.

What is claimed is:

1. A backing stabilizer adapted for use with a vehicle having a vehicle body with a first end, a second end, a first side and a second side, and a tongue having a first end pivotally connected to the vehicle body generally near the first end of the vehicle body and a second end, the tongue extending a distance from the first end of the vehicle body, comprising:
   a continuous cable having a predetermined length, a portion of the cable being connected to the tongue generally near the second end of the tongue;
   means movably connecting a portion of the cable to the vehicle body generally near the first side of the vehicle body and movably connecting another portion of the cable to the vehicle body generally near the second side of the vehicle body for supporting a portion of the cable from the vehicle body; and
   means connected to the cable generally near the portion of the cable between the portion of the cable movably connected to the vehicle body generally near the first side of the vehicle body and the portion of the cable movably connected to the vehicle body generally near the second side of the vehicle body for moving the cable to a slack condition wherein the tongue is pivotally movable and for moving the cable to a taut condition wherein the tongue substantially is held in a nonpivotable condition by the cable.

2. The backing stabilizer of claim 1 wherein the means movably connecting a portion of the cable to the vehicle body generally near the first side of the vehicle body and movably connecting a portion of the cable to the vehicle body generally near the second side of the vehicle body is defined further as movably connecting a portion of the cable to the vehicle body generally near the first side and generally near the first end of the vehicle body and as movably connecting a portion of the cable to vehicle body generally near the second side and generally near the first end of the vehicle body.

3. The backing stabilizer of claim 2 wherein the means movably connecting the cable to the vehicle body is defined further as movably connecting a portion of the cable to the vehicle body generally near the first side and generally between the first end and the second end of the vehicle body and movably connecting a portion of the cable to the vehicle body generally near the second side and generally between the first end and the second end of the vehicle body.

4. The backing stabilizer of claim 3 wherein the means for moving the cable to the slack and the taut conditions is defined further as being connected to the portion of the cable extending generally between the portion of the cable movably connected to the vehicle body generally near the first side and generally near the first end of the vehicle body and the portion of the cable movably connected to the vehicle body generally near the second side and generally near the first end of the vehicle body.

5. The backing stabilizer of claim 3 wherein the means for moving the cable to the slack and the taut conditions is defined further as being connected to the portion of the cable extending generally between the portion of the cable movably connected to the vehicle body generally near the first side and generally between the first end and the second end of the vehicle body and the portion of the cable movably connected to the vehicle body generally near the second side and generally between the first end and the second end of the vehicle body.

6. The backing stabilizer of claim 1 wherein the means movably connecting the cable to the vehicle body is defined further to include:
   a first ring having an opening extending therethrough secured to the vehicle body generally near the first side and generally near the first end of the vehicle body, the cable extending through the opening in the first ring; and
   a fourth ring having an opening extending therethrough secured to the vehicle body generally near the second side and generally near the first end of the vehicle body, the cable extending through the opening in the fourth ring, the first ring and the fourth ring cooperating to support the cable from the vehicle body.

7. The backing stabilizer of claim 6 wherein the means movably connecting the cable to the vehicle body is defined further to include:

a second ring having an opening extending therethrough secured to the vehicle body generally near the first side and generally between the first end and the second end of the vehicle body, the cable extending through the opening in the second ring; and a third ring having an opening extending therethrough secured to the vehicle body generally near the second side and generally between the first end and the second end of the vehicle body, the cable extending through the opening in the third ring.

8. The backing stabilizer of claim 7 wherein the cable extends from the tongue through the opening in the first ring, and extends from the first ring to the second ring and through the opening in the second ring, and extends from the second ring to the third ring and through the opening in the third ring, and extends from the third ring to the fourth ring and through the opening in the fourth ring, and extends from the fourth ring to the tongue.

9. The backing stabilizer of claim 8 wherein the means for moving the cable to the slack condition and to the taut condition is defined further as being connected to the portion of the cable extending between the second ring and the third ring.

10. The backing stabilizer of claim 1 wherein the means for moving the cable to the slack condition and to the taut condition is defined further to include:

a rod journally connected to the vehicle body; and means movably connecting a portion of the cable to a portion of the rod, the rod being journally movable to one position for moving the cable connected thereto to the slack condition and the rod being journally movable to one other position for moving the cable connected thereto to the taut condition.

11. The backing stabilizer of claim 10 wherein the rod is defined further to include a portion projecting from the axis of the rod, the cable being movably connected to the projecting portion, the rod being journally movable to the one position where the projecting portion extends in a direction generally toward the tongue to position the cable in a slack condition and the rod being journally movable to the other position where the projection portion extends in a direction generally away from the tongue to position the cable in the taut condition.

12. The backing stabilizer of claim 1 wherein the means for moving the cable to the slack condition and to the taut condition is defined further to include:

an actuator supported on the vehicle body and having a member movably supported therein for movement a distance from the actuator and for movement toward the actuator, the cable being movably connected to the member.

13. The backing stabilizer of claim 12 wherein the actuator is defined further as being supported on the vehicle body such that, when the member is moved in a direction away from the actuator, the member and the portion of the cable movably connected thereto are moved in a direction generally away from the tongue to move the cable to the taut condition, and such that, when the member is moved in a direction generally toward the actuator, the member and the portion of the cable movably connected thereto are moved in a direction generally toward the tongue to move the cable to the slack condition.

* * * * *